US011614779B2

(12) United States Patent
Delaporte

(10) Patent No.: US 11,614,779 B2
(45) Date of Patent: Mar. 28, 2023

(54) HINGE MECHANISM HAVING PLATE STOPS FOR A FLEXIBLE DISPLAY DEVICE

(71) Applicant: Lepton Computing LLC, Brooklyn, NY (US)

(72) Inventor: Stephen E. Delaporte, New York, NY (US)

(73) Assignee: LEPTON COMPUTING LLC, Brooklyn, NY (US)

(*) Notice: Subject to any disclaimer, the term of this patent is extended or adjusted under 35 U.S.C. 154(b) by 0 days.

(21) Appl. No.: 17/212,937

(22) Filed: Mar. 25, 2021

(65) Prior Publication Data
US 2021/0303034 A1 Sep. 30, 2021

Related U.S. Application Data

(60) Provisional application No. 62/994,571, filed on Mar. 25, 2020.

(51) Int. Cl.
*G06F 1/16* (2006.01)

(52) U.S. Cl.
CPC .......... *G06F 1/1681* (2013.01); *G06F 1/1616* (2013.01); *G06F 1/1643* (2013.01); *G06F 1/1652* (2013.01)

(58) Field of Classification Search
None
See application file for complete search history.

(56) References Cited

U.S. PATENT DOCUMENTS

| | | | | |
|---|---|---|---|---|
| 9,348,450 | B1 * | 5/2016 | Kim | G06F 1/1616 |
| 9,557,771 | B2 * | 1/2017 | Park | H04M 1/022 |
| 10,028,395 | B2 * | 7/2018 | Chen | G06F 1/1626 |
| 11,294,431 | B2 * | 4/2022 | Torres | G06F 1/1681 |
| 2015/0241925 | A1 | 8/2015 | Seo et al. | |
| 2015/0338888 | A1 | 11/2015 | Kim et al. | |
| 2017/0192460 | A1 | 7/2017 | Watanabe et al. | |
| 2021/0034116 | A1 * | 2/2021 | Torres | G06F 1/1616 |
| 2021/0034117 | A1 * | 2/2021 | Torres | G06F 1/1616 |
| 2021/0207414 | A1 * | 7/2021 | Wong | E05D 3/186 |

OTHER PUBLICATIONS

International Preliminary Report on Patentability in Application No. PCT/US2021/024214 dated Sep. 22, 2022 (10 pgs.).

* cited by examiner

*Primary Examiner* — Anthony Q Edwards
*Assistant Examiner* — Rashen E Morrison
(74) *Attorney, Agent, or Firm* — Burns & Levinson LLP; Joseph Maraia; Peter Stecher

(57) ABSTRACT

A foldable touch screen display device with a flexible display including segments that can be folded from a compact state to an expanded state, and including a hinge mechanism having plate stops is described. The form factor of the compact state is comparable to a handheld phone. The form factor of the expanded state is comparable to a larger phone or tablet computer. Both states may include an integrated speaker and microphone. The hinge mechanism's plate stops provide a support structure below and in between the device's flexible display segments, preventing folding beyond a flat open state to an obtuse angle. The device can include sensors to indicate the state of configuration and mechanisms for alignment, locking, and further structural support. A module attached to at least one segment of the flexible display or rigid display may contain all processing and memory, and a communications system usable in any state.

10 Claims, 5 Drawing Sheets

HINGE MECHANISM HAVING PLATE STOPS FOR A FLEXIBLE DISPLAY DEVICE

REFERENCE TO RELATED APPLICATIONS

The present application claims priority to U.S. Patent Application No. 62/994,571, filed Mar. 25, 2020 and titled "HINGE MECHANISM HAVING PLATE STOPS FOR A FLEXIBLE DISPLAY DEVICE," which is incorporated herein by reference in its entirety.

FIELD OF THE INVENTION

The present invention relates generally to computing devices, and more particularly, to a computing device with a touch screen display that can be folded from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

There is therefore a need for touch screen display devices that can be adjusted in size without sacrificing the convenience of being small and handheld. There is also a need for a structural hinge supports that can prevent a device from folding to undesirable angles that would comprise the life span of a flexible display or damage it to be unusable.

SUMMARY OF EMBODIMENTS OF THE INVENTION

To mitigate the difficulties associated with a small-scale touch screen, variations on flexible displays and the implementation of multiple screen displays have been proposed to enable the transformation of a display from a compact state to an expanded state. Although the use of flexible displays and multiple screen displays offer the advantages of a transformation in scale, there are still a number of limitations to how they can be implemented. For example, since a flexible display has a radius when folded, it is difficult to configure multiple segments into a folded position where the thickness of the device is not compromised. If a flexible display is to be used as a touch screen, a reconfigurable structure that can prevent the device from folding to an obtuse angle beyond the flexible display's folding capacity would be advantageous if built to reduce the mechanical complexity and thickness of the device.

There is a need for a computing device that can retain the form factor and functionality of a phone, while also providing a touch screen display that can be reconfigured from a compact state to an expanded state. Furthermore, there is a need for structural hinge supports that can prevent a flexible display from folding to obtuse angles beyond its folding capacity.

A foldable touch screen display device with a flexible display made up of segments that can be folded from a compact state to an expanded state which also includes a hinge mechanism having plate stops is disclosed. The form factor of the compact state is roughly the size of a typical handheld phone or smaller. The form factor of the expanded state is roughly the size of a larger phone or tablet computer, which may also include the mechanical functionality of a laptop. Both states may include an integrated speaker and microphone. The hinge mechanism's plate stops provide a support structure situated below and in between the device's flexible display segments which prevents the device from folding beyond a flat open state to an obtuse angle and may be situated between two or more segments. The device may further include sensors to indicate the state of configuration and mechanisms for alignment, locking, and further structural support. In one embodiment, a module attached to, situated within, or otherwise associated with at least one segment of the flexible display or rigid display may contain all or substantially all processing and memory, along with a communications system, which may be used in any state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
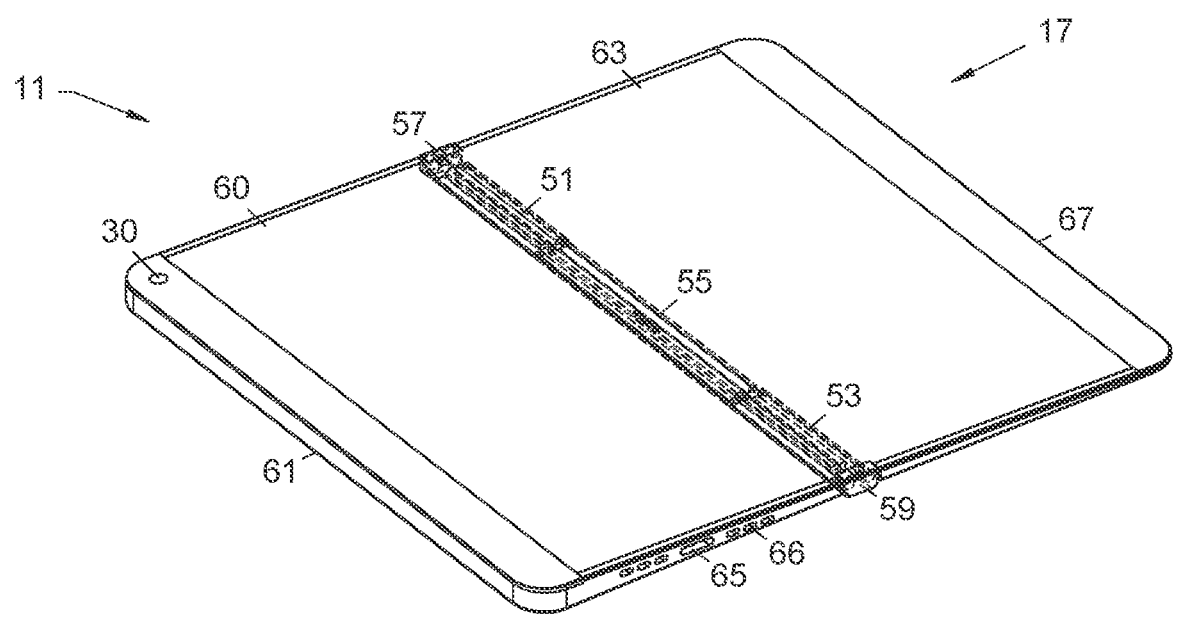
FIG. 1 is a front perspective view of a foldable computing device in an expanded state with its flexible display and hinge mechanism shown at the center of the device with hidden lines, and a back perspective view of the foldable computing device showing the underside of the hinge.
Figure 1:
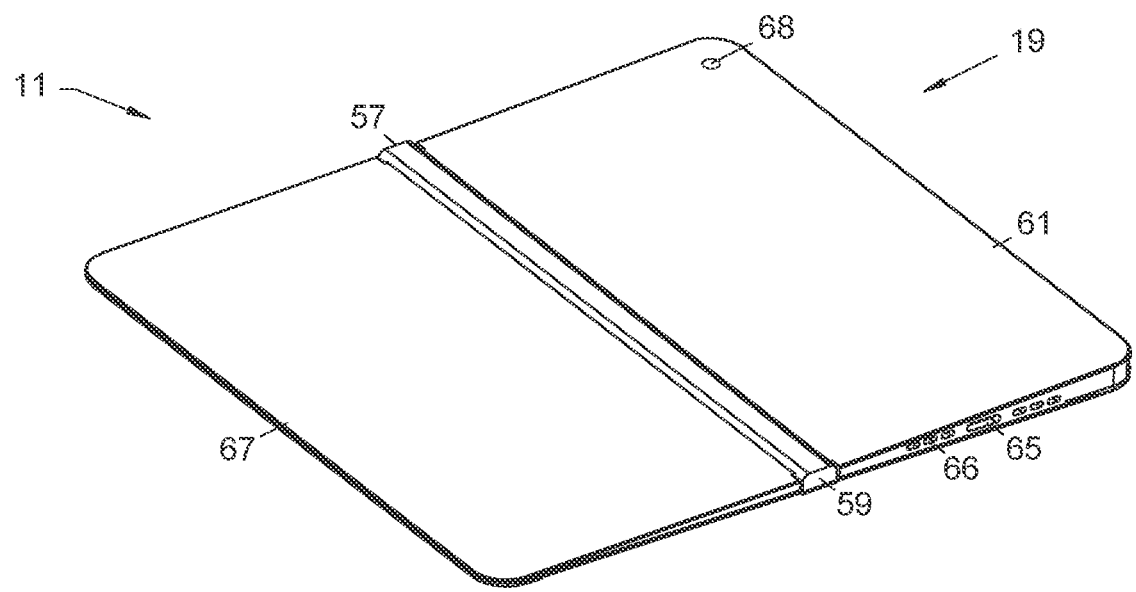

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 2:
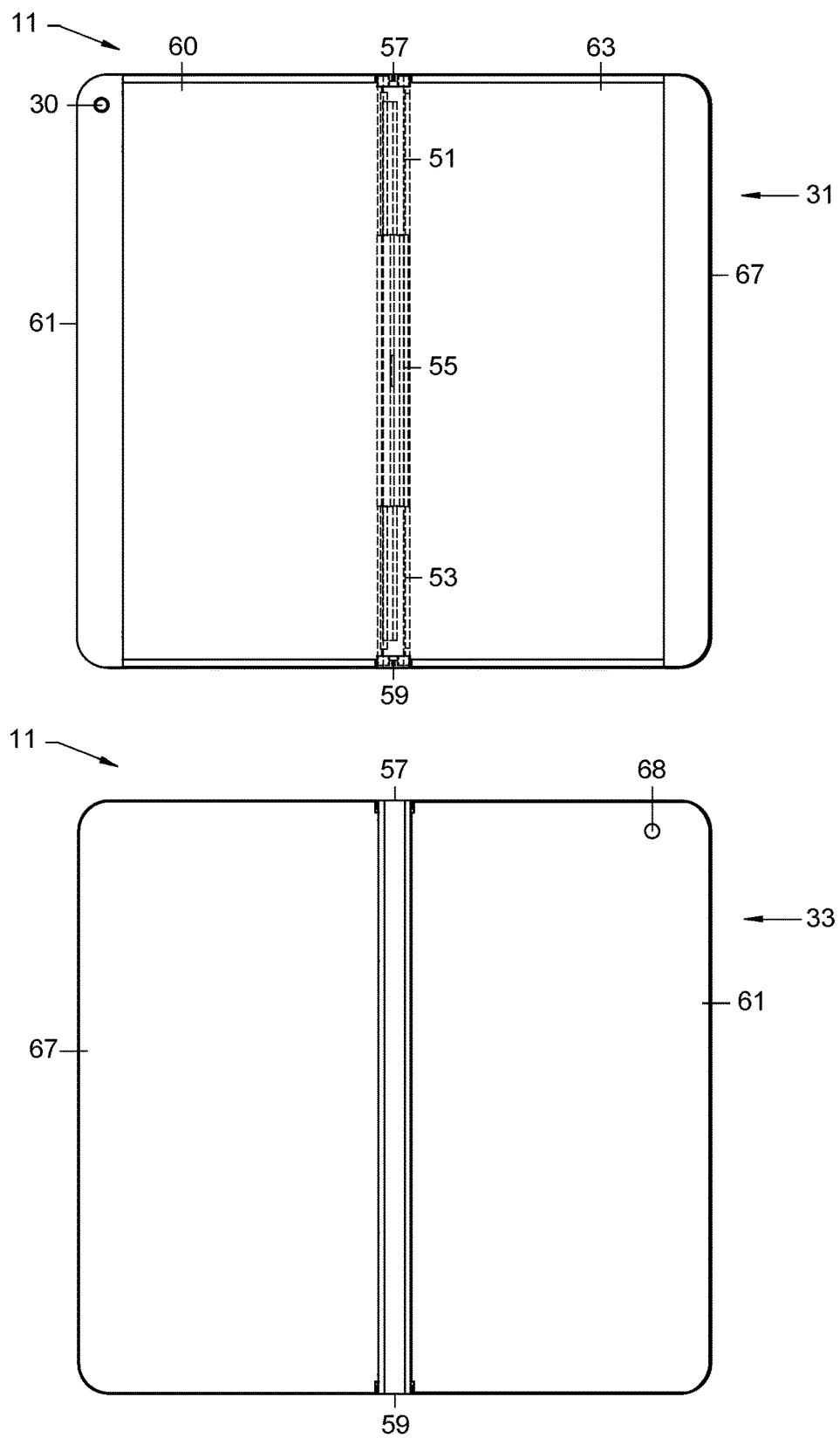
FIG. 2 is a front view and a back view of the foldable computing device from FIG. 1 shown with its flexible display and hinge mechanism.

In accordance with the exemplary embodiment shown in FIG. 1, a foldable computing device 11 is illustrated in diagram 17 in an expanded state with a first flexible display segment 60 and a second flexible display segment 63 that can fold flat against each other through hinge 59, which is situated between both segments. Diagram 17 of FIG. 1 further illustrates three major sections of hinge 59, which includes the top section 51, the middle section 55, and the bottom section 53. Sections 51 and 53 are mechanically and structurally configured as the same as each other, while section 55 is a mirror of sections 51 and 53. The details of these hinge sections and the plate stops that are directly integrated with them are further illustrated in FIGS. 3 and 4. In diagram 19, foldable computing device 11 is shown with its underside facing up to highlight how hinge 59 runs the full length of the device from the device's top side 57 to its bottom side where peripheral port 65 and speaker and microphone openings 66 are located. The left side structure 61 and the right side structure 67 can be seen in diagram drawing from FIG. 1 and FIG. 2 which support flexible display segments 60 and 63. On the top part of left side structure 61 a camera 30 is integrated, while the back part of right side structure 67 integrates a secondary camera 68.

Figure 3:
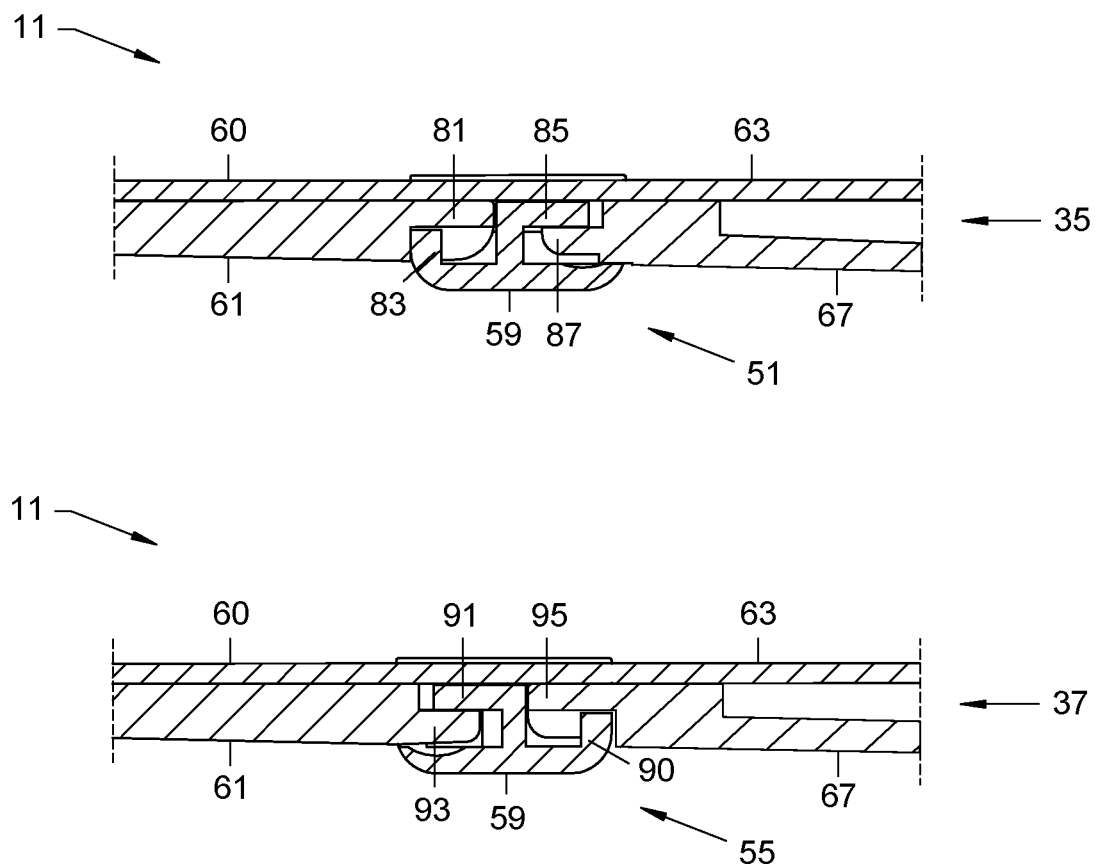
FIG. 3 shows two sectional views of the foldable computing device and hinge mechanism in an expanded state, as shown in FIG. 1, where the top view illustrates the upper section of the device and hinge, and the bottom view illustrates the middle section of the device and hinge.

To further elaborate on the details of hinge 59, FIG. 3 shows two sectional views of foldable computing device 11 with hinge 59 in an expanded state, as the device is shown in FIG. 1, where the first sectional view 35 illustrates the top section 51 of hinge 59, while the second sectional view 37 illustrates the middle section 55 of foldable computing device 11 and hinge 59. In sectional view 35, a plate stop 85 can be seen along the spine of hinge 59, which ultimately acts to stop plate 87 that extends from the right side structure 67 of foldable computing device 11 as it folds to an open position and supports flexible display segment 63. On the left side of sectional view 35, plate stop 83 is shown at the left side of hinge 59, which ultimately acts to stop plate 81 that extends from left side structure 61 and supports flexible display segment 60. In sectional view 37, a plate stop 91 can be seen along the spine of hinge 59, which ultimately acts to stop plate 93 that extends from the left side structure 61 of foldable computing device 11 as it folds to an open position and supports flexible display segment 60. On the right side of sectional view 37, plate stop 90 is shown at the right side of hinge 59, which ultimately acts to stop plate 95 that extends from right side structure 67 and supports flexible display segment 63.

It should be noted that the primary function of these structural plate stop features within a hinge sleeve is to prevent foldable computing device 11 from folding beyond a flat angle when it is an open state, and similarly preventing the display from folding beyond 90 degrees from that position when the device is in a folded state. This prevents flexible display segments 60 and 63 from being folded farther than they were designed to be folded so that the display's functionality is not compromised. When the device is in an unfolded state, it also needs to provide structural support to counter the force of a user's fingers against the device when interacting with its touch screen. These same plate stops situated with the hinge 59 and it folding mechanism could also be used to provide support to a foldable device that has a flexible display which folds in such a way that the back of two display segments meet with each other in the compact state. This is essentially the inversion of the embodiment disclosed in the drawings. Using plate stops within the hinge sleeve also provides a thinner assembly as compared with using a sleeve that is hidden away when the two structural segments are unfolded. It is important to note that this hinge configuration could be implemented with a device that has more than two segments.

Figure 4:
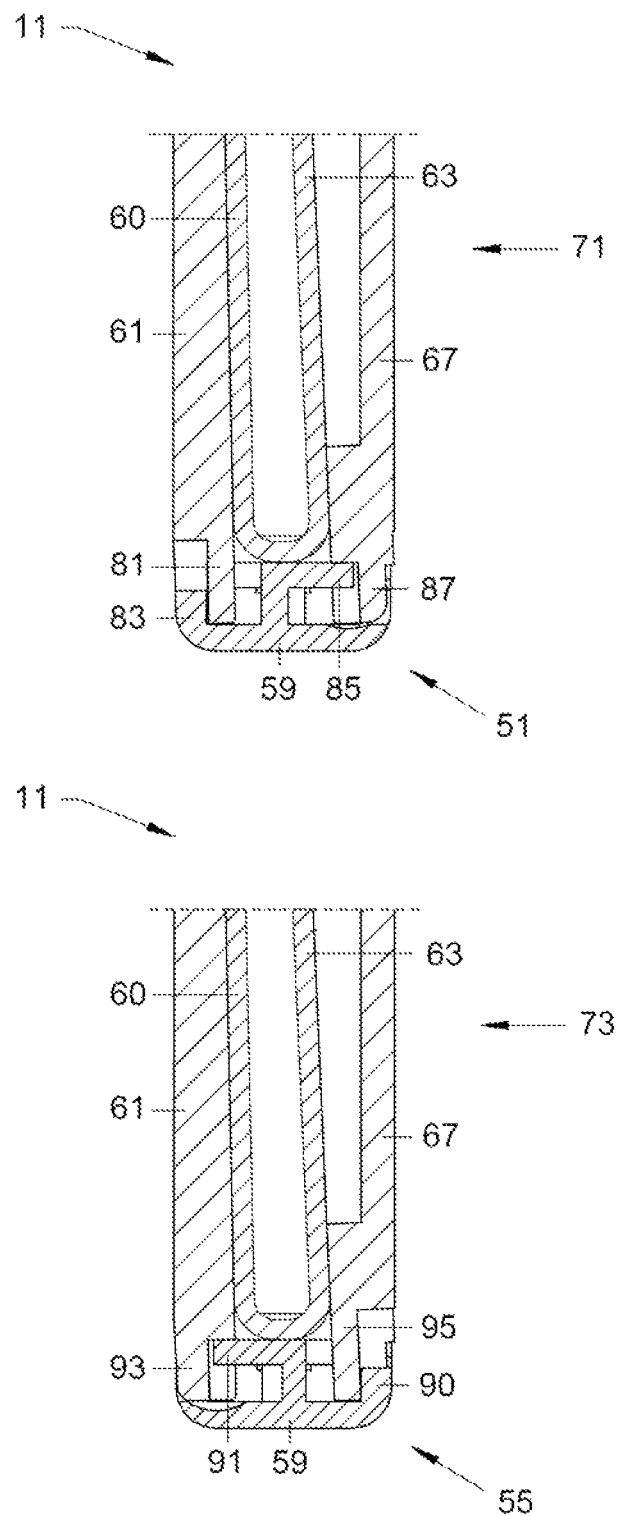
FIG. 4 shows the same two sectional views of the foldable computing device and hinge mechanism from FIG. 3, but with the device configured in a folded compact state.

In FIG. 4, sectional view 71 and all of its features corresponds with sectional view 35 from FIG. 3, and sectional view 75 and all of its features corresponds with sectional view 35 from FIG. 3. The primary difference is that sectional views 71 and 75 from FIG. 4 show the device in a folded state where the plate stop features prevent the device from folding beyond 90 degrees inward toward the center of the hinge. Because of the way that this hinge mechanism and its plate stops are configured, ultimately a thinner assembly is achieved compared with other kinds of mechanical features that might be implemented to achieve similar results. Implementing this design approach also reduces mechanical complexity, which can further reduce cost and facilitate assembly of the device.

Figure 5:
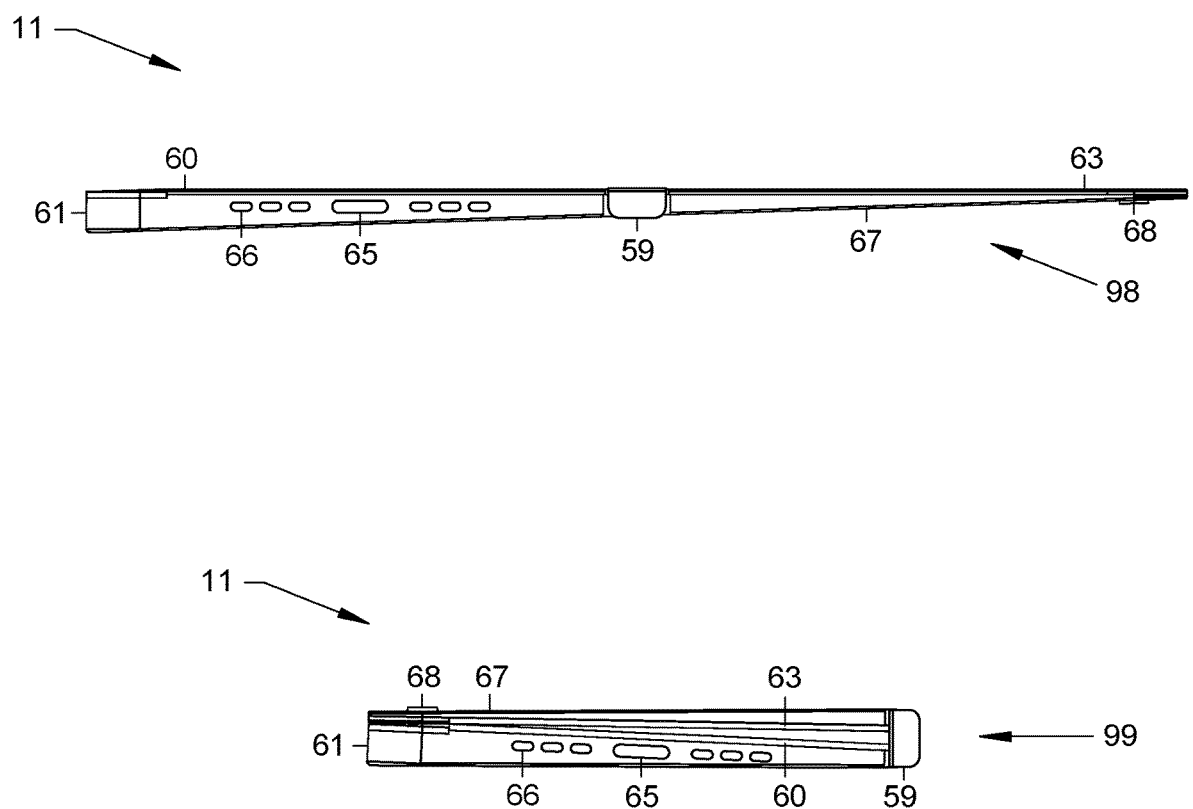
FIG. 5 is a bottom view of the foldable computing device shown in an unfolded state above, and in a folded below.

FIG. 5 shows a bottom view of foldable computing device 11 configured in an unfolded state from view 98, and then in a folded state from view 99. This diagram not only illustrates how the device folds as it relates to hinge 59, but it also shows how having a wedge shape can provide a rectangular form when the device is in a folded compact state, as shown in view 99, while still providing the small gap and angles needed to retain a radius at the center of the flexible display integrated with foldable computing device 11, which is situated between flexible display segments 60 and 63.

What is claimed is:
1. An apparatus comprising:
(a) a flexible touch-sensitive display comprising a first flexible touch-sensitive display portion and a second flexible touch-sensitive display portion; wherein:

(1) the first flexible touch-sensitive display portion is attached to a first structural support segment;
(2) the second flexible touch-sensitive display portion is attached to a second structural support segment;
(3) the flexible touch-sensitive display further comprises having a fully folded state;
(4) the flexible touch-sensitive display further comprises having a partially expanded state; and
(5) the flexible touch-sensitive display further comprises having a fully expanded state;
(b) a hinge sleeve structure connecting a first structural support and a second structural support together having at least one plate extending from the hinge sleeve structure; and
(c) a first plate integrated with the first structural support, and a second plate integrated with the second structural support, wherein the first plate or the second plate are stopped from moving when rotated against the at least one plate extending from the hinge sleeve structure; wherein
(d) the first structural support and the second structural support make up a triangulated shape in section when the apparatus is in a fully expanded state, whereby a distal end of the first structural support away from the hinge sleeve structure is at its thinnest point such that its shape tapers contiguously on at least one face of the apparatus to a thickest point at a distal end of the second structural support away from the hinge sleeve structure; and
(e) the first structural support and the second structural support make up a shape in section with a rectangular boarder when the device is in a fully folded state.

2. The apparatus of claim 1 wherein:
the at least one plate extending from the hinge sleeve structure is positioned parallel to the long top and the long bottom of the hinge sleeve structure.

3. The apparatus of claim 1 wherein:
the at least one plate extending from the hinge sleeve structure is positioned perpendicular to the long top and the long bottom of the of hinge sleeve structure.

4. The apparatus of claim 1 wherein:
the first plate is stopped by the at least one plate extending from the hinge sleeve structure when the first structural support is rotated to a folded position with respect to the second structural support.

5. The apparatus of claim 1 wherein:
the second plate is stopped by the at least one plate extending from the hinge sleeve structure when the second structural support is rotated to a folded position with respect to the first structural support.

6. The apparatus of claim 1 wherein:
the first plate is stopped by the at least one plate extending from the hinge sleeve structure when the first structural support is rotated to an unfolded position with respect to the second structural support.

7. The apparatus of claim 1 wherein:
the second plate is stopped by the at least one plate extending from the hinge sleeve structure when the second structural support is rotated to an unfolded position with respect to the first structural support.

8. The apparatus of claim 1 wherein:
the fully folded state comprises a fully folded angle between the first flexible touch-sensitive display portion and the second flexible touch-sensitive display portion that is less than 10 degrees; and
the fully expanded state comprises a fully expanded angle between the first flexible touch-sensitive display portion and the second flexible touch-sensitive display portion that is between 170 and 190 degrees; and
the partially expanded state comprises an angle that falls between the fully folded state and the fully expanded state.

9. An apparatus comprising:
(a) a flexible touch-sensitive display comprising a first flexible touch-sensitive display portion and a second flexible touch-sensitive display portion; wherein:
(1) the first flexible touch-sensitive display portion is attached to a first structural support segment;
(2) the second flexible touch-sensitive display portion is attached to a second structural support segment;
(3) the flexible touch-sensitive display further comprises having a fully folded state;
(4) the flexible touch-sensitive display further comprises having a partially expanded state; and
(5) the flexible touch-sensitive display further comprises having a fully expanded state; and
(b) a hinge sleeve structure connecting a first structural support and a second structural support together; wherein
(c) the first structural support and the second structural support make up a triangulated shape in section when the apparatus is in a fully expanded state, whereby a distal end of the first structural support away from the hinge sleeve structure is at its thinnest point such that its shape tapers contiguously on at least one face of the apparatus to a thickest point at a distal end of the second structural support away from the hinge sleeve structure; and
(d) the first structural support and the second structural support make up a shape in section with a rectangular boarder when the device is in a fully folded state.

10. The apparatus of claim 9 wherein:
the fully folded state comprises a fully folded angle between the first flexible touch-sensitive display portion and the second flexible touch-sensitive display portion that is less than 10 degrees; and
the fully expanded state comprises a fully expanded angle between the first flexible touch-sensitive display portion and the second flexible touch-sensitive display portion that is between 170 and 190 degrees; and
the partially expanded state comprises an angle that falls between the fully folded state and the fully expanded state.

\* \* \* \* \*